United States Patent Office 3,234,190
Patented Feb. 8, 1966

3,234,190
SULFONAMIDE CROSS-LINKED SULFONE POLYMERS AND PROCESS THEREFOR
Irving Tashlick, Springfield, Mass., assignor to Monsanto Company, a corporation of Delaware
No Drawing. Filed Nov. 14, 1960, Ser. No. 68,679
11 Claims. (Cl. 260—79.3)

The present invention is directed to production of sulfone polymers and more particularly to cross-linked polymers of this type.

Sulfone or sulfonyl polymers are those which contain $$\left(-\underset{\underset{O}{\overset{\overset{O}{\|}}{S}}}{\|}-\right)$$

groups in the polymer backbone. As a class they are generally known. Of the sulfone polymers presently known, those of particular interest are obtained from reacting stoichiometric equivalents of a donor compound represented by the formula:

$$H\text{—}Z\text{—}R\text{—}Z\text{—}H$$

with an acceptor compound represented by the formula:

$$\underset{X\ Y}{H\text{—}C}=\underset{}{C}-\underset{\underset{O}{\overset{\overset{O}{\|}}{S}}}{}-(R_1-\underset{\underset{O}{\overset{\overset{O}{\|}}{S}}}{}-)_n-\underset{Y\ X}{C}=CH$$

The sulfone polymers so obtained are linear in nature and can be represented by the formula:

$$\left[-Z\text{—}R\text{—}Z-\underset{X\ Y}{\overset{R\ H}{\underset{|}{C}}}-\underset{}{\overset{}{\underset{|}{C}}}-\underset{\underset{O}{\overset{\overset{O}{\|}}{S}}}{}-(R_1-\underset{\underset{O}{\overset{\overset{O}{\|}}{S}}}{}-)_n-\underset{}{\overset{}{\underset{|}{C}}}-\underset{Y\ X}{\overset{H\ H}{\underset{|}{C}}}-\right]_m$$

Throughout the representation used, R designates a divalent organic radical, $R_1$ a divalent aliphatic radical free of functional groups, X and Y radicals selected from the class consisting of hydrogen, alkyl and aryl radicals, Z designates a component selected from the class consisting of oxygen and sulfur and m is an integer designating the number of repeating polymer units and n is 0 or 1. The linear polymers so produced are thermoplastic in nature. They have utility as molding compositions, films, fibers, etc. In that they do not readily cross-link, however, they will not exhibit solvent and heat resistance.

Accordingly, it is a principal object of the present invention to produce readily cross-linkable sulfone polymers.

Another object is to produce cross-linked or thermoset sulfone polymers.

Another object is that of obtaining sulfone polymers exhibiting improved properties of solvent and heat resistance, as well as dimensional stability.

Other objects of the invention will in part be obvious and will in part appear hereinafter.

These and other objects of the present invention can be attained through practice of a process which comprises the steps of (A) forming a cross-linkable pre-polymer mixture the sulfone polymer molecules of which contain at least two vinyl-sulfone groups, by reacting a sulfone starting material or acceptor component selected from the class consisting of monosulfones represented by the formula:

$$X\left[\underset{\underset{O}{\overset{\overset{O}{\|}}{S}}}{}(-\underset{}{\overset{R_1}{\underset{|}{C}}}=\underset{}{\overset{R_2}{\underset{|}{C}}}-R_3)_{n-2}\right]$$

and polysulfones represented by the formula:

$$X\left[R(-\underset{\underset{O}{\overset{\overset{O}{\|}}{S}}}{}-\underset{}{\overset{R_1}{\underset{|}{C}}}=\underset{}{\overset{R_2}{\underset{|}{C}}}-R_3)_n\right]$$

with less than a stoichiometric quantity of an active hydrogen containing compound or donor component selected from the class consisting of polyhydric alcohols, polyhydric thiols and monosubstituted amines represented by the formula:

$$X_1[R(-ZH)_{n_1}]$$

and amines represented by the formula:

$$X_1[R(-NH_2)_{n_1/2}]$$

the said quantity being such that the ratio of $n.X$ to $n_1.X_1$ is greater than unity $$\left(\frac{nX}{n_1X_1}>1\right)$$

and wherein $n$ and $n_1$ represent integers of at least 2 and X and $X_1$ represent numbers of moles of each reactant and thereafter (B) cross-linking the said sulfone pre-polymer mixture to provide a thermoset polymer by reacting the same with a sulfonamide selected from the class consisting of primary and secondary sulfonamides containing at least two sulfonamido hydrogens in the presence of a basic catalyst except that when the number of vinyl sulfone groups contained in the said pre-polymer is two the sulfonamide must contain more than two sulfonamido hydrogens and wherein throughout the said process R is selected from the class consisting of organic radicals having a valence of 2–6 and free of reactive functional groups, $R_1$, $R_2$ and $R_3$ are selected from the class consisting of hydrogen, alkyl and aryl radicals, and Z is selected from the class consisting of monosubstituted nitrogen, oxygen and sulfur.

The following examples are entered in illustration of the invention. Where parts are mentioned, parts by weight are intended unless otherwise described.

EXAMPLE I

A. *Pre-polymer preparation*

A solution constituted of 21.27 g. (0.18 mole) divinyl sulfone dissolved in 15 ml. of 1,2 dimethoxyethane and a second solution constituted of 9.55 g. (0.09 mole) diethylene glycol and 2.76 g. (0.03 mole) glycerin dissolved in 20 ml. 1,2 dimethoxyethane are prepared under essentially anhydrous conditions. About 5 ml. of the glycol solution is first reacted with 0.02 g. of sodium hydride and the reaction product which results, and which is designed to serve as a strong basic catalyst is slowly added to the divinyl sulfone solution. The remainder of the glycol solution is added to the divinyl sulfone solution over a period of 30 minutes. The reaction is exothermic in nature and the temperature is maintained between 30°–40° C. by cooling. After addition is complete, the resulting solution is maintained under stirring for an hour. Thereafter, 4 drops of acetic acid plus a few crystals of hydroquinone are added to stabilize the resulting resin against further reaction. At that point, the solvent which remains is removed under vacuum of 30 mm. Hg at 40° C. The residue then obtained is a light yellow, viscous oil which absorbs about 20% by weight of water, is soluble in acetone, and insoluble in dioxane, benzene, ethanol, and tetrahydrofuran. When the IR spectrum of the pre-polymer is taken and compared to that of the unreacted starting mixture, it evidences marked reduction in hydroxyl group absorption, strong absorption due to new ether linkages and retention of some vinyl linkages. The pre-polymer resin contains molecules calculated to have a molecular weight of about 1,100, and three vinyl-sulfone groups.

B. *Cross-linking step*

A 5.5 g. sample of the pre-polymer product above is mixed with 0.82 g. of ethyl sulfonamide (.0075 mole) and the mixture warmed to 100° C. until a clear solution is obtained. The solution is allowed to stand overnight and remains liquid. The liquid is thinned with 5 ml. of acetone, and 0.2 ml. of 10% potassium tertiary butoxide in tetrahydrofuran is added. A polished metal plate is dipped into the resin liquid to provide a viscous liquid film and allowed to drip dry. The plate is then hung in a hood for 12 hours at room temperature. A strongly adherent, glossy film develops on the flat surface of the plate.

The film remains adhered to the plate when the same is immersed in acetone warmed to 100° C.

EXAMPLE II

A. *Pre-polymer preparation*

A solution of 0.015 grams (0.000625 mole) of sodium hydride dissolved in 16.22 g. (0.18 mole) of 1,4-butanediol is prepared. This solution is added slowly to a stirred flask containing 28.36 g. (0.24 mole) divinyl sulfone. After the addition of 5-7 ml. of the 1,4-butanediol solution there is a rapid rise in temperature from 24° C. to 90° C. The addition of 1,4-butanediol solution is continued under stirring at a rate designed to maintain the temperature between 70° C. and 90° C. When addition is complete, the reaction mixture is heated to 120° C. and held at that temperature for 2 hours. The mixture is then cooled to room temperature, and is then observed to be a light yellow to colorless viscous syrup which can be poured at room temperature.

An analysis of the hydroxyl content of the pre-polymer mixture by acetylation with acetic anhydride in pyridine shows that 95% of the hydroxyl groups originally present have been reacted. From this, the average molecular weight of the pre-polymer molecules is calculated to be about 700 and contain two vinyl-sulfone groups. When tested by IR spectrum analysis the presence of free vinyl groups and ether linkages is evidenced.

B. *Cross-linking step*

A 11.83 g. portion of the pre-polymer above is heated to about 100° C. and 2.00 g. (0.008 mole) of powdered toluene 2,4-disulfonamide is completely dissolved in the same. The solution is mixed with 0.6 g. of N,N'-dimethylbenzyl amine and immediately poured into an aluminum bar mold. The mold is maintained at 90° C. for 60 minutes to free the casting of bubbles. Thereafter, it is maintained at 90° C. for an additional 90 minutes during which time the resin gels. After cooling to room temperature, the molded bar is removed from the mold and post-cured for an additional 120 minutes at 120° C. The cast bar has a glass transition temperature $T_{(g)}$ of 4° C. Sections of the bar are allowed to stand in benzene, acetone, carbon tetrachloride and water, each at room temperature and show little or no swelling over 5 days. Similar sections are swollen but not otherwise attacked when allowed to stand for 5 days in dimethyl formamide and pyridine. When a similar cross-linking reaction is attempted omitting the catalyst, curing does not take place after 8 hours at 130° C.

EXAMPLE III

A. *Pre-polymer preparation*

A solution of 0.015 g. (0.000625 mole) sodium hydride dissolved in 13.42 g. (0.10 mole) of 1,2,6-hexanetriol is prepared and is then slowly added to a stirred flask containing 29.54 g. (0.25 mole) of divinyl sulfone. After the addition of a few ml. an orange color appears followed by a sharp rise in temperature from 25° C. to 80° C. The reaction mixture then becomes colorless and addition is completed while maintaining the temperature between 65-100° C. The colorless syrup is stirred at 120° C. for 2 hours and cooled to give a clear, colorless tacky syrup which flows stiffly at room temperature.

Acetylation values of the syrup with acetic anhydride in pyridine indicate that 88% of the hydroxyl groups originally present have been reacted. When tested by IR spectrum analysis the presence of free vinyl groups and ether linkage is noted. The pre-polymer molecules are calculated to have greater than two vinyl-sulfone groups and have a molecular weight of 860.

B. *Cross-linking step*

(1) A 9.59 g. portion of the pre-polymer product is mixed with 3.28 g. (0.01 mole) of powdered 4,4'-phenoxyphenyl disulfonamide and the solution kept at 90–100° C. until completely degassed. The solution is cooled to 30° C. and 0.1 g. of tributyl amine is stirred in. The solution obtained is poured into a bar mold and allowed to stand at 90–100° C., again to allow degasification, after 30 minutes solid bars are formed. The bars are then cured at 130° C. for 4 hours. When the bars are removed they are observed to have a light yellow coloration. Each is hard, glossy and tough with a $T_{(g)}$ of 60° C. The cast bars show no flow at temperature up to their decomposition temperature and they resist attack by acetone, benzene and carbon tetrachloride.

(2) A cross-linking step in the manner of B(1) above is again carried out with the exception that 6.0 g. (.02 mole) of N,N'-diethyl-2,4-toluene disulfonamide is used as the cross-linking agent. The cast bars which result have properties similar to those previously obtained except for exhibiting slight lowering of the $T_{(g)}$ and more flexibility.

EXAMPLE IV

A. *Pre-polymer preparation*

A solution of 0.08 g. (0.0007 mole) of potassium tertiary butoxide dissolved in 17.31 g. (0.16 mole) 1,3-propanedithiol is slowly added to a stirred flask containing 23.63 g. (0.20 mole) of divinyl sulfone. After the addition of a few ml. of the dithiol solution, the temperature rises slowly. Addition is continued over a period of about 1 hour and then the reaction mixture is heated to 100° C. and held at this temperature for an hour. On cooling, the resultant product is a viscous oil.

The pre-polymer is tested to assess the percentage of thiol groups reacted. This involves titration with silver nitrate. The results show 98% of these groups reacted. IR spectrum analysis confirms the presence of vinyl groups. The number of vinyl-sulfone groups per pre-polymer molecule is calculated to be two.

B. *Cross-linking step*

A 5.2 g. portion of the pre-polymer resin above is stirred with 0.93 g. (0.0033 mole) of N-ethyl-meta-benzene disulfonamide and the resulting solution warmed to 100° C. and so maintained for 35 minutes allowing for degasification. A .02 g. portion of tetraethylethylene diamine is added and stirred into the solution. The liquid resin is spread onto a glass plate using a 3 mil doctor blade. The assembly is allowed to stand at 90° C. for 30 minutes and then cured in an air circulating oven for 2 hours at 120° C. The assembly is removed and allowed to cool to room temperature. The surface film which is clear and continuous can be peeled off the plate. When immersed in hot acetone, the film shows slight swelling but otherwise remains unattacked.

EXAMPLE V

A. *Pre-polymer preparation*

A solution of 15.54 g. (0.1 mole) piperazine dissolved in 75 ml. warm dioxane, is slowly added with stirring to 28.36 g. (0.24 mole) of divinyl sulfone. An exothermic reaction results on addition, and after addition is complete the reaction mixture is refluxed for 1 hour at atmospheric pressure. On evaporation of the solvent, a viscous liquid remains. When the IR spectrum of this liquid is taken the (a) presence of free vinyl groups and (b) virtual absence of secondary amine groups is noted. The molecular weight can be calculated as about 730. The number of vinyl-sulfone groups contained in the pre-polymer molecules is calculated at two.

B. Cross-linking step

A 7.3 gram portion of the pre-polymer resin above is stirred with 1.6 g. (.005 mole) of powdered 4,4'-diphenyl disulfonamide and 0.1 g. of N,N'-dimethylbenzyl amine. The result is an opaque white dispersion which is poured into a mold. After curing for 3 hours at 120° C., the casting is nearly clear in color and has become solidified. After an additional 3 hours curing at 160° C., the casting is completely transparent. At that point the casting is allowed to cool and removed from the mold to give a flexible yet solid bar which, when immersed in hot acetone for 6 hours, remains unattacked and only slightly swollen, and neither does the material of the bar flow up to the point of thermal decomposition.

EXAMPLE VI

A. Pre-polymer preparation

A mixture of 15.01 g. (0.10 mole) of triethylene glycol and 66.8 g. (0.20 mole) 4,4'-di(vinylsulfonyl)diphenyl is added to 200 ml. of dimethoxyethane and heated to boiling. The mixture is cooled to 40° C. and 1 ml. of a 10% solution of potassium tertiary butoxide in tetrahydrofuran is added with vigorous agitation to give an exothermic reaction. The solution is then heated to reflux and so maintained for 2 hours. On evaporation of the solid, an extremely viscous liquid is isolated which solidifies to a low melting solid on standing for a week.

When subjected to IR spectrum analysis, the liquid resin product evidences the presence of free vinyl groups and an increase in ether linkages over those evidenced in the starting materials. Acetylation values of the liquid product by the acetic acid and pyridine method indicates that 8% of the hydroxyl groups remain unreacted. The number of vinyl-sulfone groups retained in the pre-polymer molecules are calculated as two.

B. Cross-linking step

An 8.18 g. portion of the pre-polymer resin above is mixed with 1.25 g. (.005 mole) of toluene 2,4-disulfonamide. The mixture is heated to 100° C. to produce a clear solution, and is then degassed by holding is at 90° C. for 30 minutes. A 0.2 g. portion of N,N'-dimethylbenzyl amine is added then and the solution spread onto a thin aluminum foil. The excess is wiped off and a sheet of kraft paper superimposed. The assembly is then placed in a flat bed press and a temperature of 130° C. applied for a period of 30 minutes. The laminate which results is resilient and the bond resists separation on repeated bending and creasing, as well as resisting attack to hot acetone and water.

EXAMPLE VII

A. Pre-polymer preparation

N-amyl amine in the amount of 1.74 g. (0.02 mole) is added to a mixture of 9 g. (0.03 mole) of 2,4-di(propenylsulfonyl) toluene in 60 ml. of dioxane. This is paralleled by a rise in temperature to 40° C. After addition is complete, the reaction mixture is refluxed for 60 minutes. Thereafter, excess solvent is evaporated at 30 mm. Hg and 50° C. The residue which remains is an extremely viscous, amber liquid resin product which shows free vinyl groups, and a trace of unreacted amino-hydrogen. The molecular weight of the product is about 1000.

B. Cross-linking step

To a 5.0 g. portion of the resin produced above, is added 0.82 g. (.0025 mole) of 4,4'-phenoxyphenyl disulfonamide. The mixture is heated to 100° C. to produce a clear solution, which is then degassed at a temperature of 90° C. The latter takes about 30 minutes. The solution is cooled, and 0.1 g. of N,N'-dimethylbenzyl amine is added as a catalyst. The solution is poured into a bar mold and cured at 160° C. for 3 hours. The mold is cooled and the bar removed. The cast bar has a light yellow coloration, and is flexible in nature. It swells but does not dissolve in acetone when immersed in the same for a period of 12 hours.

The present invention is directed to a two-step process by which to produce thermoset sulfone polymers. In the first step, a cross-linkable pre-polymer mixture is produced, which retains at least two vinyl-sulfone groups in the molecules thereof. This is followed by the second step in which the pre-polymer is cross-linked to produce the desired thermoset sulfone polymers exhibiting predetermined molecular weights.

More particularly, the process of the present invention constitutes (A) forming a cross-linkable pre-polymer mixture comprising sulfone polymer molecules containing at least 2 vinyl-sulfone groups in the said molecules, by reacting a sulfone starting material or acceptor component selected from the class consisting of monosulfones represented by the formula:

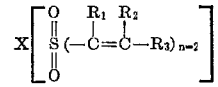

and polysulfones represented by the formula:

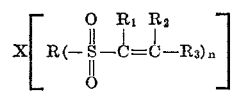

with less than a stoichiometric quantity of an active hydrogen-containing compound or donor component selected from the class consisting of polyhydric alcohols, polyhydric thiols and mono-substituted amines represented by the formula:

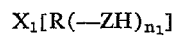

and amines represented by the formula:

the said quantity being such that the ratio of $n.X$ to $n_1.X_1$ is greater than unity $$\left(\frac{nX}{n_1X_1} > 1\right)$$

and wherein $n$ and $n_1$ represent integers of at least two and $X$ and $X_1$ represent numbers of mols of each reactant and thereafter (B) cross-linking the said sulfone pre-polymer mixture by reacting the same with a sulfonamide selected from the class consisting of primary and secondary sulfonamides containing at least two sulfonamido-hydrogens in the presence of a basic catalyst except that when the number of vinyl-sulfone groups contained in the molecule of said pre-polymer is two the sulfonamide must contain more than two sulfonamido-hydrogens, and wherein throughout the said process R is selected from the class consisting of organic radicals having a valence of 2–6 and free of reactive functional groups $R_1$, $R_2$ and $R_3$ are selected from the class consisting of hydrogen, alkyl and aryl radicals, and Z is selected from the class consisting of mono-substituted nitrogen, oxygen and sulfur.

A. Discussion of Step A directed to the production of a cross-linkable sulfone pre-polymer The sulfone starting material, or acceptor compounds used in production of the pre-polymer contains a sulfone group

group or groups adjacent to terminal ethylenic

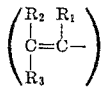

groups, wherein $R_1$, $R_2$, and $R_3$ are selected from the class consisting of hydrogen, alkyl and aryl radicals. The first group of these materials are the monosulfones which can be represented by the formula:

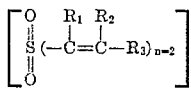

wherein $R_1$, $R_2$ and $R_3$ are selected from the class consisting of hydrogen, alkyl and aryl groups. In the case of monosulfones, then a single sulfone group separates two terminal ethylenic groups. Specific examples of the monosulfones include divinyl sulfone, propenyl sulfone, isopropenyl sulfone, (alpha-ethyl vinyl)sulfone, (alpha-n-propyl vinyl)sulfone, 1-butenyl sulfone, (alpha-phenyl vinyl) sulfone, styryl sulfone, etc.

The polysulfone starting materials can be represented by the formula:

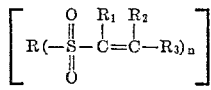

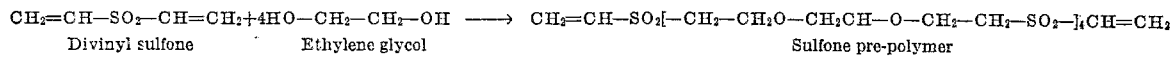

Then with respect to a polysulfone starting material:

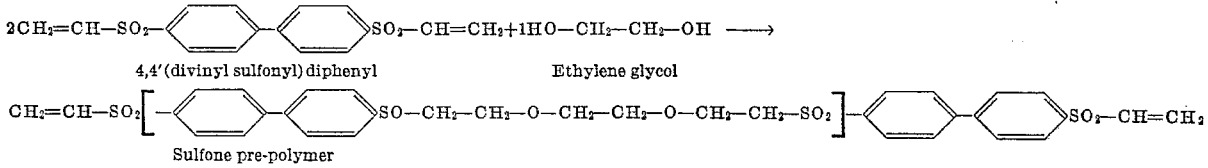

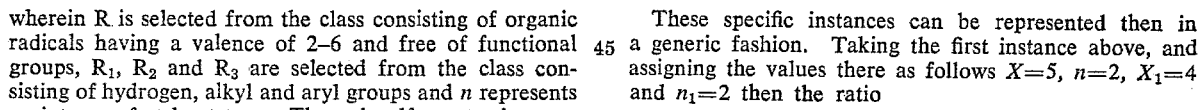

wherein R is selected from the class consisting of organic radicals having a valence of 2–6 and free of functional groups, $R_1$, $R_2$ and $R_3$ are selected from the class consisting of hydrogen, alkyl and aryl groups and $n$ represents an integer of at least two. The polysulfone starting materials then contain more than one sulfone group. Specific examples of the polysulfone starting materials include 1,2-bis(vinyl sulfonyl)ethane, 1,4-bis(vinyl sulfonyl)butane, bis(beta,beta'-vinyl sulfonyl)ethyl ether, 4,4'-di(vinyl sulfonyl)diphenyl, 2,4,6-tri(vinyl sulfonyl)toluene, 2,2',4,4'-tetra(vinyl sulfonyl)diphenyl, 1,2-di(vinyl sulfonyl methoxy)ethane, etc.

The active hydrogen containing compound or donor component which is reacted with the acceptor compound in order to produce the pre-polymer can be selected from the class consisting of polyhydric alcohols, polyhydric thiols and mono-substituted amines represented by the formula:

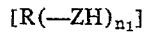

and amines represented by the formula:

Specific donor compounds included within the polyhydric alcohols are: ethylene glycol, 2,3-butylene glycol, diethylene glycol, tetramethylene glycol, decamethylene glycol, glycerine, hydroquinone, resorcinol, 1,2,6-hexanetriol, 1,4-butanediol, 4,4'-dihydroxy diphenylmethane, phloroglucinol, catechol, trimethylol nitromethane, etc., bis-beta-hydroxyethyl adipamide. Specific examples of the polythiol donors are: bis-beta-mercaptoethyl adipate, ethylene dithiol, trimethylene dithiol, decamethylene dithiol, bis-(2-thiol ethyl)ether, 2-thiol ethanol, thiodiglycol, bis-(beta-hydroxyethyl)sulfoxide, bis-(beta-hydroxyethyl)sulfone. Examples of monosubstituted amines are: 1,6-hexamethylene diamine, p-xylene diamine, 1,3-propane diamine, p-phenylene diamine. The intended amine donors are represented specifically by: piperazine, tetraethylene triamine, N,N'-diethyl phenylene diamine, N,N'-dimethyl ethylene diamine and mixtures of the same.

In the formation of the pre-polymer, the acceptor component is reacted with less than a stoichiometric quantity of donor component. In this manner, the pre-polymer molecules which result from the reaction will contain at least two vinyl sulfone groups. With the occurrence of side chains on the pre-polymer molecule, the number of vinyl-sulfone groups can be greater than two in number.

The prescribed reactions can be illustrated relative to specific instances. First, in relation to a monosulfone starting material:

These specific instances can be represented then in a generic fashion. Taking the first instance above, and assigning the values there as follows $X=5$, $n=2$, $X_1=4$ and $n_1=2$ then the ratio $$\frac{nX}{n_1X_1}=\frac{10}{8}>1$$

The generic reproduction for the reaction then is as follows:

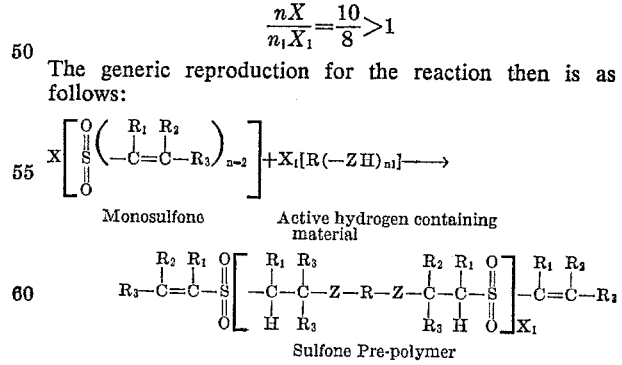

In similar fashion with respect to the reaction of the polysulfone above, the values for $X=2$, $n=2$, $X_1=1$ and the $n_2=2$ and the ratio $$\frac{nX}{n_1X_1}=\frac{4}{2}>1$$

This reaction can be generically represented as:

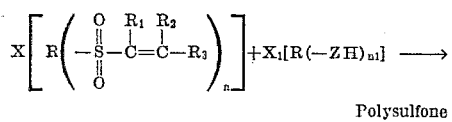

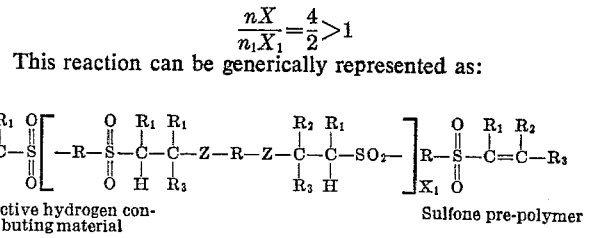

Throughout the generic representation above, R represents an organic radical having a valence of 2–6 and free of reactive functional groups, $R_1$, $R_2$ and $R_3$ represents either hydrogen, alkyl or aryl radical, Z represents monosubstituted nitrogen, oxygen or sulfur, $n$ and $n_1$ represent integers of at least 2 and X and $X_1$ represent numbers of moles of the sulfone starting material and active hydrogen contributing compound, respectively.

The pre-polymer formation reaction is carried out as a catalysis reaction. When the donor component is either a polyol or water, a strong base is used. Strong bases which are useful as catalyst here include quaternary ammonium hydroxides, such as trimethyl benzyl ammonium hydroxide; alkali and alkaline earth metals, oxides, hydroxides, hydrides and carbonates as exemplified by potassium, potassium hydroxide, sodium hydride and potassium carbonate, potassium tertiary butoxide, butyl lithium, calcium oxide, barium oxide, etc. The amounts of the strong basic catalysts to be used are preferably minute, as little as 0.01 of a mole percent can be used. When the donor component is an amine no catalyst is needed. However, when the donor is a polythiol a weak basic catalyst is recommended such as tributyl amine, N,N'-dimethylbenzyl amine, etc. The amount used in the latter case can be on the order of 0.1 of a mole percent.

The pre-polymer formation reaction can be carried out at any convenient temperature and pressure. The reaction is exothermic and necessary precautions should be exercised. Heating can be carried out after the reaction is ostensibly completed in order to insure completion of reaction and expediture of reactants. The reaction can be carried out in nonreactant solvents such as dioxane, acetone, chloroform, benzene, etc. or in mass. The pre-polymer can be retained in the solvent, when the same is used, or extracted from the same.

Additives and adducts can be used to stabilize the pre-polymer mixture, as for instance by addition of sufficient acid to neutralize the catalyst. Since the pre-polymer mixture contains free vinyl groups in the molecules thereof free-radical inhibitors such as hydroquinone, tertiary butyl catechol, etc., can be used to advantage when cross-linking of the pre-polymer is to be postponed. It bears emphasis that the pre-polymer mixture to be effective for later cross-linking must contain these free vinyl or more particularly free vinyl sulfone groups.

The pre-polymer mixture is made up of low molecular weight polymer molecules containing free vinyl sulfone groups. This gives a pre-polymer mixture which is either (a) liquid in nature or (b) easily dissolved in solvents such as water or organic solvents to give liquids, in either case having relatively low viscosities facilitating handling of the same preparatory to their being cross-linked. For this reason, they can be poured easily into molds, interstices, onto laminate substrates, etc., anticipatory to their being cross-linked into a permanent, hardened condition. Specifically, the pre-polymers should hav molecular weights ranging from 300 to 5000.

B. Cross-linking step

The sulfone pre-polymer, constituted of low molecular weight polymers and containing free vinyl sulfone groups in the polymer molecules thereof is cross-linked by reacting the same in the presence of a basic catalyst with a sulfonamide selected from the class consisting of primary and secondary sulfonamides containing at least two sulfonamido-hydrogens, except when the number of vinyl sulfone groups in the molecules of the pre-polymer are two. The sulfonamide must contain more than two sulfonamido-hydrogens.

The sulfonamide cross-linking agents include within the primary sulfonamides; ethyl sulfonamide, propyl sulfonamide, N-butyl sulfonamide, isobutyl sulfonamide, phenyl sulfonamide, p-toluene sulfonamide, meta-benzene disulfonamide, toluene 2,4-disulfonamide, 4,4'-phenoxyphenyl disulfonamide, 4,4'-diphenyl disulfonamide, 1,4-cyclohexane disulfonamide, diethyl ether disulfonamide, 2,6-naphthalene disulfonamide, etc.; secondary sulfonamides as represented by the N,N'-diethyl 2,4-toluene disulfonamide, N,N'-diethyl meta-benzene disulfonamide, N,N'-dimethyl-1,5-pentane disulfonamide, N,N-diphenyl-2,4-toluene disulfonamide, N,N'-diphenyl-1,5-pentane disulfonamide, etc.; and mixed primary-secondary sulfonamides such as N-ethyl meta-benzene disulfonamide, N-ethyl-4,4'-biphenyl disulfonamide, N-methyl-1,4-naphthalene disulfonamide, diphenoxy triethylene glycol disulfonamide, etc. Preferably the amount of disulfonamide to be used in the cross-linking reaction is 50–150% of the stoichiometric quantity as determined on the vinyl sulfone content of the pre-polymer, while more or less of this amount can be used it is less desirable, with less than the prescribed amount leading to retention of unsaturation in the final product and more than the prescribed amount effecting little, if any, improvement in cross-linking.

The cross-linking step is dependent upon the use of basic or alkali catalysts. While strong basic catalysts such as the alkaline earth metal catalysts, can be used they are less desirable than the weak basic catalysts, of the weak alkali catalyst the tertiary aliphatic amines are most preferred. Examples of the latter include triethyl amine, tripropyl amine, tributyl amine, triamyl amine, N,N'-dimethyl benzyl amine, N-ethyl morpholine, tetramethyl ethylene diamine, N,N'-dimethyl piperazine, N-methyl piperazine, diethylcyclohexyl amine. The amount of catalyst preferably ranges from 0.5% to 5.0% of the total weight of the total reactants.

The cross-linking steps can be practiced in widely varying manner and locations. The pre-polymer mixtures can be used directly as obtained from the formation reaction, or the pre-polymer molecules can be extracted from that reaction mixture and used, or in either case the pre-polymer can be dissolved, suspended or otherwise carried in a liquid or other medium, and in each case can be mixed with the cross-linking agent and catalyst. Preferably, the pre-polymer is heated to dissolve the sulfonamide, prior to addition of the catalyst. Once the ingredients are mixed, heat can be again applied to initiate or facilitate the cross-linking reaction. However, in most cases, curing temperatures of greater than 100° C. can be used to advantage. Pressure as well as temperature can be used if desired, during the cross-linking reaction.

The cross-linking reaction can be carried out in varied sites, such as molds when thermoset castings are to be made, material interstices, surfaces and interfaces when laminating and adhering activities are carried on. In addition, the cross-linking reaction can be carried out in the presence of various inert fillers, pigments, etc.

The cross-linked sulfone polymers which eventuate from practice of the present invention have broad utility in application where qualities of thermosetting, dimensional stability and solvent resistance are desired. These will include moldings, castings, films, fibers, laminates, etc. They are particularly attractive in adhesion and laminating applications. They can be cured or set from the pre-polymer state to the final cross-linked state within a comparatively short time using relatively mild conditions. In addition, these polymers exhibit low dissipation factors making them extremely useful as potting compounds for electrical components.

It will thus be seen that the objects set forth above, among those made apparent from the preceding description, are efficiently attained and, since certain changes may be made in the above products and in carrying out the process by which they are obtained without departing from the scope of the invention, it is intended that all matter contained in the above description shall be interpreted as illustrative and not in a limiting sense.

What is claimed is:

1. A process for producing sulfone polymers exhibiting predetermined molecular weights and cross-linking which process comprises the steps of (A) forming a cross-linkable pre-polymer mixture comprising sulfone polymer molecules of low molecular weight retaining at least two vinyl sulfone groups in said molecules, by reacting a sulfone starting material selected from the class consisting of monosulfones represented by the formula:

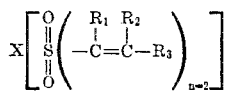

and polysulfones represented by the formula:

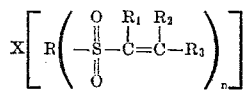

with less than a stoichiometric quantity of an active hydrogen-containing compound selected from the class consisting of polyhydric alcohols, polyhydric thiols and monosubstituted amines represented by the formula:

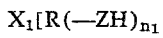

and amines represented by the formula:

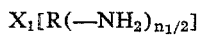

and mixtures of the same, the said quantity being such that the ratio of $n.X$ to $n_1.X_1$ is greater than unity $$\left(\frac{nX}{n_1X_1} > 1\right)$$

and wherein $n$ and $n_1$ represent integers of at least two and $X$ and $X_1$ represent numbers of moles of each reactant and thereafter (B) cross-linking the said sulfone pre-polymer mixture by reacting the same in the presence of a basic catalyst with a sulfonamide selected from the class consisting of primary and secondary sulfonamides containing at least two sulfonamido-hydrogens, except that when the number of vinyl sulfone groups retained in the said pre-polymer is two, the sulfonamide must contain more than two sulfonamido-hydrogens and wherein throughout both steps of the said process R is selected from the class consisting of organic radicals having a valence of 2–6 and free of reactive functional groups, $R_1$, $R_2$ and $R_3$ are selected from the class consisting of hydrogen, alkyl and aryl radicals, and Z is selected from the class consisting of monosubstituted nitrogen, oxygen and sulfur.

2. The process according to claim 1 wherein the sulfonamide is a primary sulfonamide.

3. The process according to claim 1 wherein the starting material is divinyl sulfone.

4. A process according to claim 1 wherein the catalyst is an aliphatic tertiary amine.

5. A process for providing a cross-linked sulfone polymer which comprises the steps of reacting divinyl sulfone with less than a stoichiometric quantity of diethylene glycol and glycerin to produce a pre-polymer having more than two vinyl sulfone groups in the molecule of same and cross-linking the said pre-polymer by reacting the same with ethyl sulfonamide in the presence of potassium tertiary butoxide.

6. A process for providing a cross-linked sulfone polymer which comprises the steps of reacting divinyl sulfone with less than a stoichiometric quantity of 1,4-butanediol to produce a pre-polymer having two vinyl sulfone groups in the molecule of same, and, cross-linking the said pre-polymer by reacting the same with toluene 2,4-disulfonamide in the presence of N,N'-dimethyl benzylamine.

7. A process for providing a cross-linked sulfone polymer which comprises the steps of reacting divinyl sulfone with less than a stoichiometric amount of 1,2,6-hexanetriol to produce a pre-polymer having more than two vinyl sulfone groups in the molecules of the same, and, cross-linking the same with 4,4'-phenoxyphenyl disulfonamide in the presence of tributyl amine.

8. A process for providing a cross-linked sulfone polymer which comprises the steps of reacting divinyl sulfone with less than a stoichiometric quantity of 1,2,6-hexanetriol to produce a pre-polymer having more than two vinyl sulfone groups in the molecules of the same, and, cross-linking the said pre-polymer by reacting the same with N,N'-diethyltoluene-2,4-disulfonamide in the presence of tributyl amine.

9. A process for providing a cross-linked sulfone polymer which comprises the steps of reacting divinyl sulfone with less than a stoichiometric amount of 1,3-propanedithiol to produce a pre-polymer having two vinyl sulfone groups in the molecule of same, and, cross-linking the said pre-polymer by reacting the same with N-ethyltoluene disulfonamide in the presence of tetraethylethylene diamine.

10. A process for providing a cross-linked sulfone polymer which comprises the steps of reacting divinyl sulfone with less than a stoichiometric quantity of piperazine to produce a pre-polymer having two vinyl sulfone groups in the molecule of the same, and, cross-linking the said pre-polymer by reacting the same with 4,4'-diphenyl disulfonamide in the presence of N,N'-dimethylbenzyl amine.

11. A process for providing a cross-linked sulfone polymer which comprises the steps of reacting 4,4-di(vinyl sulfonyl) diphenyl with less than a stoichiometric quantity of triethylene glycol to produce a pre-polymer having two vinyl sulfone groups in the molecule of the same, and, cross-linking the said pre-polymer by reacting the same with toluene 2,4-disulfonamide in the presence of N,N'-dimethylbenzyl amine.

References Cited by the Examiner

UNITED STATES PATENTS

| | | | |
|---|---|---|---|
| 2,623,035 | 12/1952 | Schappel | 260—79.3 |
| 3,031,435 | 4/1962 | Tesoro | 260—79.3 |

FOREIGN PATENTS 650,742  2/1951  Great Britain.

JOSEPH L. SCHOFER, *Primary Examiner.*

H. N. BURSTEIN, J. R. LIBERMAN, LEON J. BERCOVITZ, *Examiners.*